US011904484B2

(12) United States Patent
Delplanche

(10) Patent No.: US 11,904,484 B2
(45) Date of Patent: Feb. 20, 2024

(54) KNIFE WITH SPECIALIZED BALANCE AND BLADE LENGTH

(71) Applicant: Benchmade Knife Co., Inc., Oregon City, OR (US)

(72) Inventor: Mark Delplanche, Beavercreek, OR (US)

(73) Assignee: Benchmade Knife Co., Inc., Oregon City, OR (US)

( * ) Notice: Subject to any disclaimer, the term of this patent is extended or adjusted under 35 U.S.C. 154(b) by 129 days.

(21) Appl. No.: 17/409,743

(22) Filed: Aug. 23, 2021

(65) Prior Publication Data

US 2022/0055233 A1 Feb. 24, 2022

Related U.S. Application Data

(60) Provisional application No. 63/069,613, filed on Aug. 24, 2020.

(51) Int. Cl.
*B26B 1/08* (2006.01)

(52) U.S. Cl.
CPC .................................... *B26B 1/08* (2013.01)

(58) Field of Classification Search
CPC ........................................................ B26B 1/08
USPC ......................................................... 30/162
See application file for complete search history.

(56) References Cited

U.S. PATENT DOCUMENTS

| | | | |
|---|---|---|---|
| 7,305,769 | B2 | 12/2007 | McHenry |
| 7,797,838 | B2 | 9/2010 | Chu |
| 8,595,941 | B2 | 12/2013 | Lee |
| 8,966,771 | B2 | 3/2015 | Chu |
| 9,056,398 | B2 | 6/2015 | Liao |
| 9,375,854 | B2 | 6/2016 | Chu |
| 9,498,889 | B1 | 11/2016 | Hawk |
| 9,676,105 | B2 | 6/2017 | McChesney |
| 9,764,485 | B1 * | 9/2017 | Hawk ...................... B26B 1/04 |
| 10,427,310 | B2 | 10/2019 | Scimone |
| 10,500,740 | B1 | 12/2019 | Marfione |
| 2006/0112565 | A1 | 6/2006 | Moser |
| 2006/0260261 | A1 * | 11/2006 | Cervenko .......... E04F 13/0807 52/712 |
| 2008/0222897 | A1 | 9/2008 | Marfione |
| 2010/0024609 | A1 * | 2/2010 | Chuang ................ B25B 27/205 81/424.5 |
| 2013/0174423 | A1 * | 7/2013 | Liao ....................... B26B 5/001 30/162 |
| 2014/0157606 | A1 * | 6/2014 | Owens ..................... B26B 9/00 30/345 |

(Continued)

FOREIGN PATENT DOCUMENTS

| | | | |
|---|---|---|---|
| CN | 202071084 | U | 12/2011 |
| DE | 8710560 | U1 | 10/1987 |

(Continued)

*Primary Examiner* — Nhat Chieu Q Do
(74) *Attorney, Agent, or Firm* — Schwabe Williamson & Wyatt, P.C.

(57) ABSTRACT

A knife including a handle, a blade, and an enclosed blade action is configured to have an optimized weight ratio of the blade to the handle when the blade is extended, the handle can be kept relatively smaller and lighter with a slimmer profile, but without sacrificing rigidity and durability. The slimmer and lighter handle allows a longer blade but without the increased weight resulting from a bulkier handle typically necessitated by the longer blade.

13 Claims, 6 Drawing Sheets

(56) References Cited

U.S. PATENT DOCUMENTS

| | | | |
|---|---|---|---|
| 2014/0173911 | A1 | 6/2014 | Chu |
| 2017/0050325 | A1 | 2/2017 | Lee |

FOREIGN PATENT DOCUMENTS

| | | | |
|---|---|---|---|
| FR | 1459280 | | 4/1966 |
| FR | 3088565 | A1 | 5/2020 |
| TW | 200734142 | A | 9/2007 |
| WO | WO2019104295 | A1 | 5/2019 |
| WO | WO2019217569 | A1 | 11/2019 |

* cited by examiner

KNIFE WITH SPECIALIZED BALANCE AND BLADE LENGTH

RELATED APPLICATION

The present application claims priority to U.S. Provisional Patent Application No. 63/069,613, filed Aug. 24, 2020, entitled KNIFE WITH SPECIALIZED BALANCE AND BLADE LENGTH, the entire disclosure of which is hereby incorporated by reference.

TECHNICAL FIELD

The present disclosure relates to the field of retractable knives, and specifically to a knife with a specialized or optimized balance weight and blade length.

BACKGROUND

Knives are available in a variety of designs. Generally, knives can be configured with either a fixed blade or a moveable blade. With a fixed blade knife, as the name suggests, the blade is attached to the handle such that the blade is in a fixed position and cannot be moved. Moveable blade knives allow the blade to move relative to the handle, typically between a stowed position for carrying, and an extended position for use. Moveable blade knives are available in a variety of configurations. A common configuration is the so-called “Swiss Army knife”, a folding knife where the blade pivots relative to the handle to fold into the handle for storage, and fold out to an extended position for use. Examples of other configurations include a butterfly knife, where the handle splits and pivots relative to the blade, and out-the-front (OTF) knives, where the blade is retained within the handle under spring tension. The spring tension propels the knife out of the handle in a linear fashion into an extended position when a catch or button is tripped. In some implementations (e.g. “double action” knives), the knife may also be held under spring tension when extended, so that the blade will retract back into the handle when the catch or button is subsequently tripped again

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
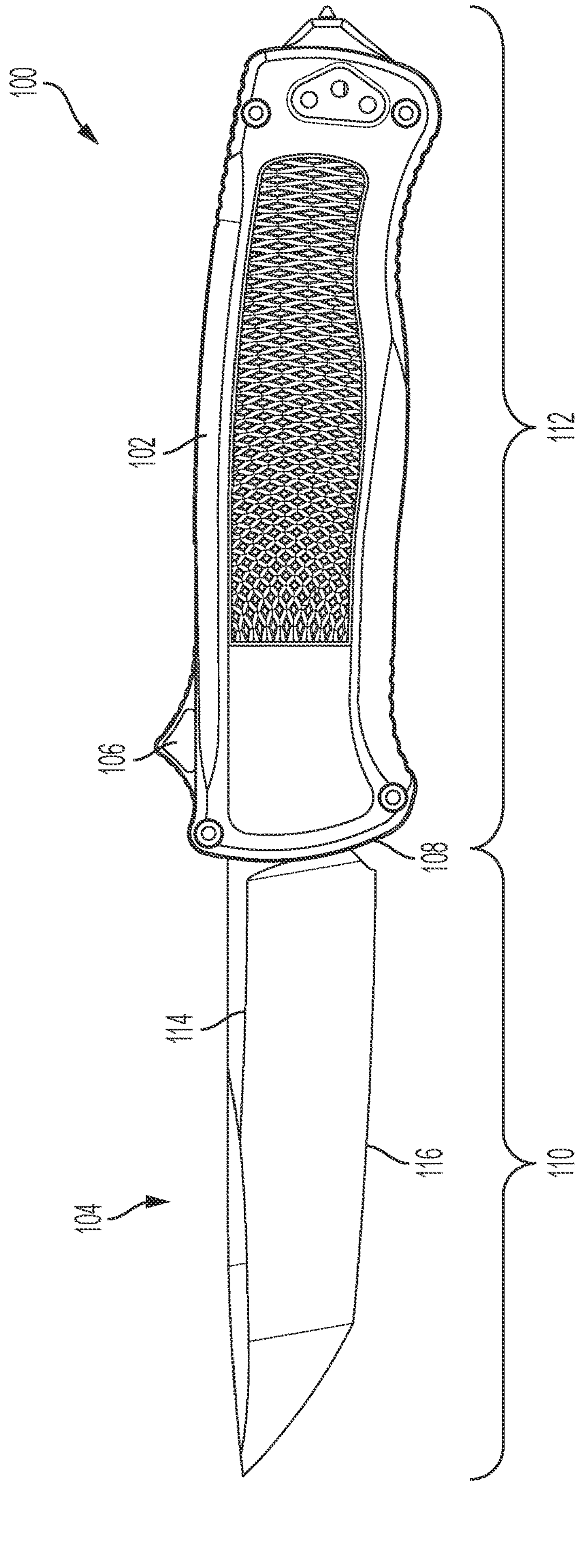
FIG. 1 is a side elevation view of an example out-the-front knife with an optimized blade length and balance, in an extended configuration, in accordance with various embodiments.

In the following detailed description, reference is made to the accompanying figures which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms “coupled” and “connected,” along with their derivatives, may be used. It should be understood that these terms are not intended as synonyms for each other. Rather, in particular embodiments, “connected” may be used to indicate that two or more elements are in direct physical contact with each other. “Coupled” may mean that two or more elements are in direct physical contact. However, “coupled” may also mean that two or more elements are not in direct contact with each other, but yet still cooperate or interact with each other.

For the purposes of the description, a phrase in the form “A/B” or in the form “A and/or B” means (A), (B), or (A and B). For the purposes of the description, a phrase in the form “at least one of A, B, and C” means (A), (B), (C), (A and B), (A and C), (B and C), or (A, B and C). For the purposes of the description, a phrase in the form “(A)B” means (B) or (AB) that is, A is an optional element.

The description may use the terms “embodiment” or “embodiments,” which may each refer to one or more of the same or different embodiments. Furthermore, the terms “comprising,” “including,” “having,” and the like, as used with respect to embodiments, are synonymous.

The feel of a knife is dependent upon a number of different factors, including its overall balance: whether the knife is blade heavy, handle heavy, or balanced between the two. This balance is typically considered with the knife in an extended or operational position. A proper balance on a knife can enhance ease of use when cutting, and also reduce operator fatigue when the knife is used for an extended period of time. Depending upon the intended application of a knife, the overall weight and heft may also impact comfort. If a knife is too light and/or handle-heavy, the user may need to expend a greater effort to cut compared with a knife that is balanced, where at least some of the blade's weight can be used to help cutting. Similarly, if a knife is too heavy or blade-heavy, the user may find the knife unwieldly and difficult to control precisely.

Blade length also impacts usability. As a general rule, longer knife blades result in heavier knifes, although can offer more leverage in some situations. Moreover, as a knife blade gets longer, typically the handle gets heavier, both due to increased length to accommodate the blade length, and because of greater internal reinforcement needed to maintain a handle rigidity sufficient to handle stresses imposed during use. The handle may also need to be thicker to accommodate the knife's action components, which correspondingly need to be larger to accept the longer blade. To maintain a good weight ratio, the blade itself may need to be made thicker than otherwise necessary to balance out the larger handle. As a result, larger knives can rapidly increase in weight, and become effectively unusable for people who lack sufficient arm and/or hand strength.

Embodiments disclosed herein provide a knife that has an optimized weight ratio and blade proportion. By adjusting the construction of the internal structures of the handle and the enclosed blade action, the handle can be kept relatively smaller and lighter, but without sacrificing rigidity and durability. Consequently, the blade can also be kept thinner, maintaining a good balance while still allowing the knife to be relatively light. Furthermore, the disclosed embodiments reduce the number of components required for the knife, which aids assembly and allows for more secure attachment of the various components.

FIG. 1 depicts an example knife 100 according to some embodiments. Knife 100 includes a handle 102, from which extends a blade 104. In the depicted embodiment, knife 100 is an out-the-front (OTF) configuration, where blade 104 extends out of an aperture 108 upon actuation of button 106. Knife 100 can be defined by a length ratio of a blade length 110 to handle length 112. Both handle 102 and blade 104 contribute to the weight of knife 100. As such, the overall balance of weight of knife 100 is dependent upon both the length of knife 100, as well as the weight distribution across the length of the knife 100, e.g. the weight of blade 104 balanced by the weight of handle 102. A person skilled in the art will understand that these ratios and balance will change between closed/retracted and open/extended configurations, as the position of blade 104 changes. As used here, "weight ratio" will refer to the ratio of the overall weight of knife 100 compared to its overall length when in an extended configuration, as depicted in FIG. 1, unless otherwise specified.

In the depicted embodiment, handle 102 encloses the various components of the knife 100's action, and further stores blade 104 when the action is in a retracted configuration. Handle 102 is thus sized based upon the length and size of the blade 104 and the associated action components. Furthermore, handle 102 may be shaped ergonomically, to accommodate the hand of an average user as well as to provide comfort and control of the blade 104 when the knife 100 is in use. The exterior of handle 102 may include texturing, stippling, finger notches and/or other features to enhance grip and control when in use. The shell or housing of handle 102 may be constructed from a material that is sufficiently durable to withstand the forces imposed upon knife 100 while in use, such as plastic, composites, metal, wood, bone, or another suitable material. The choice of materials can impact the overall weight and balance of knife 100, and may be selected with respect to the material used for blade 102, as well as the components of the knife action. Various components of the action will be described below.

Blade 104 may be smooth, as shown in the depicted embodiment, serrated, or a combination of either. Blade 104, in embodiments, may have various other features, depending upon the intended use of knife 100. Blade 104 is configured to slide in and out of handle 102, to move between an extended position for use, and a stored position. In some embodiments, blade 104 slides substantially along the longitudinal axis defined by handle 102 and blade 104, and passes into or out of handle 102 via aperture 108. Depending upon the configuration of handle 102, in other embodiments blade 104 may travel into handle 102 at an angle relative to the longitudinal axis of handle 102. In still other embodiments, blade 104 may define a plane and handle 102 may define a second plane, and the plane of blade 104 may diverge from the plane of handle 102 as blade 104 travels, to allow for improved handle 102 ergonomics.

Blade 104 may taper from a thicker ridge 114 to a sharpened edge 116, for cutting. Ridge 114 forms the spine of blade 104, providing structural rigidity to blade 104 and resisting bending. The thickness of ridge 114 may depend upon the materials used to construct blade 104, as well as the overall length of blade 104. A longer blade 104 may necessitate a thicker ridge 114 and, correspondingly, a thicker handle 102. Blade 104 may be constructed from any suitable material that can be sharpened to hold edge 116, such as carbon steel, damascus steel, carbide, ceramic, composites, or another suitable material now known or later developed. The arrangement of the ridge 114, including its thickness and taper, if any, may also impact the overall balance of knife 100. For example, if ridge 114 is thicker proximate to handle 102 (when blade 104 is in an extended position) and thinner at its tip, distal from handle 102, then the weight of blade 104 will be more centered around or shifted toward aperture 108. Conversely, if ridge 114 is thicker nearer the tip, distal from handle 102, then the weight of blade 104 may be centered further along its length, away from handle 102. Thus, by altering the shape of blade 104, such as by changing the profile of ridge 114, the overall balance of knife 100 can be adjusted. Further, it will be understood that the balance of blade 104 may impact the construction and weighting of handle 102 in order to achieve a particular desired balance of knife 100. Conversely, the configuration of blade 104 and its ridge 114 can be adjusted in connection with a given configuration of handle 102 to achieve a desired weight and/or balance of knife 100 when in an extended configuration. These considerations further may be balanced against a desired ratio of blade length to handle length, where a desired ratio may constrain blade 104 and its ridge 114 to a particular balance and configuration.

Knife 100, in the depicted embodiment, includes a button 106 for actuating the action of knife 100, causing blade 104 to be propelled from handle 102. Where knife 100 is a double action knife, button 106 may be subsequently toggled to cause the action of knife 100 to retract blade 104 back into handle 102. In some other embodiments, button 106 may be used to unlock blade 104 so that it can be manually slid back into handle 102. In the depicted embodiment, button 106 is a slide that can move parallel to the longitudinal axis of handle 102. In other embodiments, button 106 may move a different direction, such as transverse to the longitudinal axis, or may be an actual button that can be depressed to actuate the action of knife 100. The configuration of button 106 may depend upon the nature of the action of knife 100.

In various embodiments, the length of handle 102 is selected with respect to the length of blade 104. In most embodiments, the blade size is maximized relative to the handle size, to the point where increasing the blade size further would result in a loss of space needed for the action components; at such a point, the handle must be increased to achieve further blade size increases. Thus, handle 102 is designed be sufficiently long to fully enclose blade 104 and the action components. Possible additional length may be added to ensure a comfortable grip in some embodiments where the length of blade 104 is relatively short compared to width of an average user's grip. However, generally, embodiments seek to maximize the blade that can be installed into a given handle, which can be achieved by altering the configuration of the handle and action components, examples of which are described herein.

With respect to the ratio of blade length 110 to handle length 112, in one possible embodiment, a ratio of a 3.5"× 0.85" blade (length×height) to a 2.8 oz. overall weight, where handle 102 is manufactured from plastic, has been determined to provide optimal handling. Blade length 110, in the depicted embodiment, is approximately 3.5", with a more precise length of 3.5132", and handle length 112 is approximately 4.7", with a precise length of 4.7142". This yields an overall length of knife 100 of approximately 8.2", and more precisely 8.2218". Note that the total length is slightly less than adding blade length 110 to handle length 112, which yields a sum of 8.2274"; this is due to a small portion of the blade length 110 overlapping the end of handle length 112. Such an embodiment may have a weight of approximately 2.8 oz. In other embodiments, the blade may have a thickness of between approximately 0.100 to 0.140 inches. In still another embodiment, depicted in FIG. 7, blade length 110 may be approximately 3.93", with a blade width of 0.74", and handle length 112 is approximately 5.04", for a sum of 8.97". The weight of such an embodiment may be approximately 3.0 oz.

In the first example embodiment discussed above, there is a length to weight ratio of 8.2" to 2.8 oz., or approximately 2.93:1. In the second example embodiment, depicted in FIG. 7, there is a length to weight ratio of 8.97" to 3.0 oz., or approximately 2.99:1. Thus, an ideal length to weight ratio is approximately 3:1, expressed in terms of inches to ounces (e.g., three inches of length to every ounce of weight). The weight of the blade relative to the weight of the handle may impact how the knife 100 balances when in hand, e.g. blade heavy, handle heavy, or balanced. The knife blade 104 may be constrained in its weight due to the need for sufficient rigidity to be useable and avoid any bending or breaking, with a portion of the blade, e.g. ridge 114, needing to be sufficiently thick along the length of the blade 104 to provide structural rigidity. Consequently, a desired knife balance and weight may depend upon the configuration of the handle and its action. To achieve a balanced knife, it may be necessary to utilize a streamlined action that allows a reduction in handle size and corresponding weight.

Figure 2:
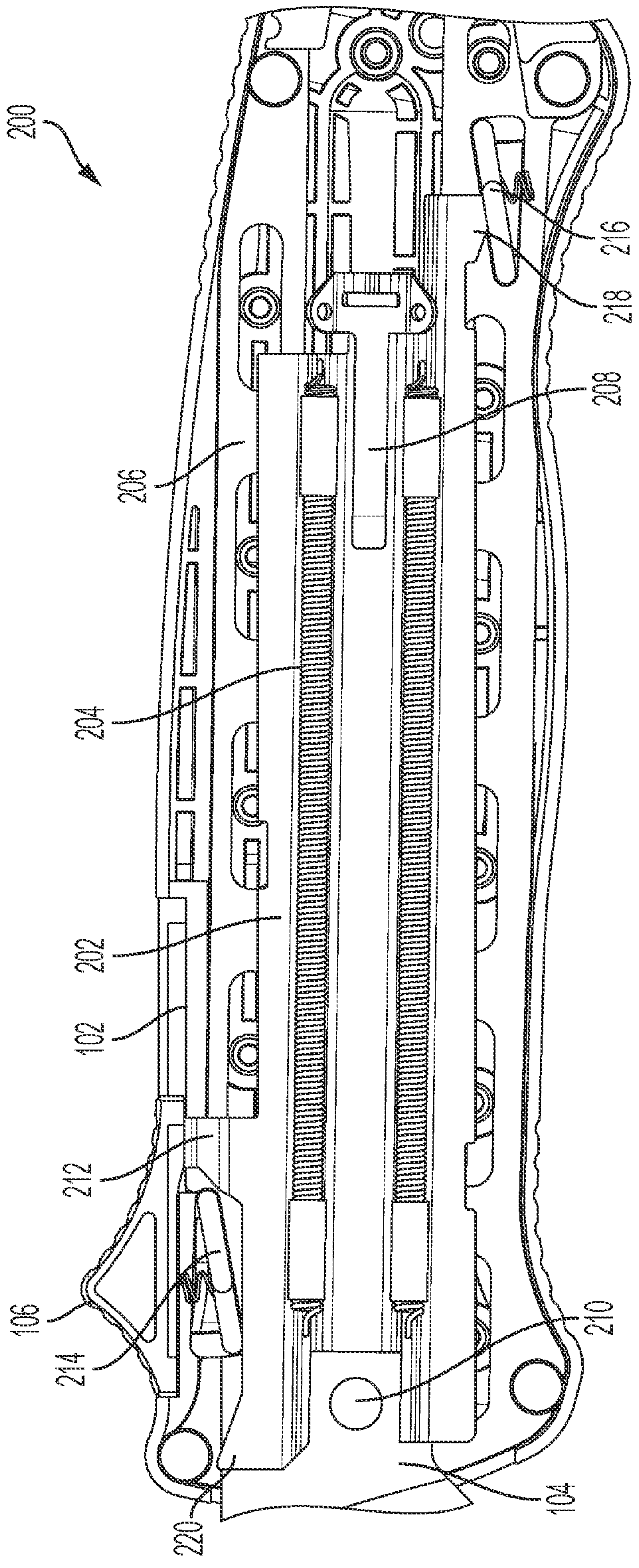
FIG. 2 is a side cutaway view of the handle of the example knife of FIG. 1, according to various embodiments.

Turning to FIG. 2, various components of the action 200 of example knife 100, as contained in handle 102, are depicted, according to embodiments. FIG. 2 depicts half of handle 102, with the other half removed so that the components of action 200 are visible. Action 200 in the disclosed embodiment includes a ribbed first liner 202, a slotted second liner 206, and one or more springs 204. The blade 104 slides between the first liner 202 and second liner 206, propelled by springs 204 upon actuation of button 106. First liner 202 cooperates with button 106 to effect both loading of the springs 204 prior to action 200 triggering, as well as selectively triggering other components of the action 200 based on a user's manipulation of button 106, to cause blade 104 to selectively extend from or retract into handle 102. Second liner 206, as will be described below, provides a relatively smooth path through which blade 104 can travel upon actuation of the action 200 by moving button 106. First liner 202 and second liner 206 will be discussed below in greater detail with respect to FIGS. 3A, 3B, 4A, and 4B.

Springs 204 may each be disposed within a corresponding groove formed by the ribs of ribbed first liner 202. The use of a groove can help position each spring 204 in closer proximity to blade 104, which can save space within handle 102. While the depicted embodiment includes two springs, fewer or more springs may be utilized depending upon the requirements of a given implementation. The springs 204 may be calibrated to supply sufficient force to propel blade 104 through aperture 108 to a fully extended position, with consideration to the overall configuration of the action 200. In some embodiments, the springs 204 may cease providing force before blade 104 is fully extended, relying upon the momentum imparted to blade 104 by springs 204 and/or gravity to carry it to a fully extended position. In embodiments where action 200 is of a double-action configuration, the momentum/gravity may be sufficient to impart a tension on the springs 204 prior to the end of the travel of blade 104 so that springs 204 are sufficiently biased to retract blade 104 into handle 102. Springs 204 may be manufactured of any suitable spring material.

In the depicted embodiment, blade 104 may be held in either a stowed position within handle 102 or a fully extended position outside of aperture 108 by the action of either first latch 214, when the blade 104 is extended, or second latch 216, when the blade 104 is stowed. Each of first latch 214 and second latch 216 interacts with a tab or lip (not shown) on the tang of blade 104 to retain blade 104 in the extended or stowed position, respectively. First latch 214 and second latch 216 are each spring biased to engage with the tab or lip once the tab or lip clears the latch 214 or 216. First liner 202 and one or more catches 208 cooperate with an aperture or apertures 210 disposed on or through the tang of blade 104, to impart force from springs 204 to blade 104 for either extension or retraction. When blade 104 is stowed, catch 208 in the depicted embodiment is engaged with aperture 210. When blade 104 is extended, a second catch (not shown) disposed proximate to aperture 108 is engaged with aperture 210. Although a single aperture 210 is depicted, in some embodiments, the tang of blade 104 may have two apertures 210 arranged along the longitudinal axis; a forward aperture 210 to engage with a forward catch, and a rear aperture 210 behind the forward aperture to engage with the rear catch 208.

In embodiments, button 106 impinges upon or is otherwise coupled to a trigger protrusion 212 formed from first liner 202 so that sliding button 106 either forward (towards aperture 108) or rearward longitudinally along handle 102 likewise causes first liner 202 to slide longitudinally within handle 102. Where action 200 is double-action (both extends and retracts blade 104), as in the depicted embodiment, in the case of blade 104 extension, button 106 is slid forward (towards aperture 108), causing first liner 202 to likewise slide towards aperture 108. As first liner 202 slides forward, it engages the catch closest to aperture 108 while catch 208 at the rear of handle 102 is engaged with aperture 210. As a result, tension is applied to springs 204. At the same time, ramp 218 on first liner 202 contacts latch 216, which causes latch 216 to be forced down away from the tang of blade 104, and to clear the lip on the tang of blade 104. Once latch 216, which was preventing forward movement of blade 104 by engaging the lip of blade 104's tang, clears the lip, springs 204 drive blade 104 forward towards aperture 108 and out of handle 102, the force imparted by the interaction of catch 208 with aperture 210. As blade 104 slides forward, aperture 210 engages with the forward catch proximate to aperture 108, causing springs 204 to be at least partially pre-loaded. A lip on the tang of blade 104 slides past upper latch 214, which drops behind the lip. The springs 204 arrest the forward movement of blade 104 and bias it against upper latch 214, locking blade 104 in an extended position.

For retraction, the process is essentially the same, except in reverse: Button 106 is slid rearward (away from aperture 108), causing first liner 202 to slide rearward. As it slides rearward, it contacts catch 208 at the rear of handle 102, which further tensions springs 204. At the same time, ramp 220 on first liner 202 contacts upper latch 214, forcing it up and causing it to clear the lip on the tang of blade 104. Once cleared, springs 204 drive blade 104 rearward into handle 102. Aperture 210 picks up catch 208 and causes springs 204 to be at least partially pre-loaded. The lip on the tang of blade 104 clears past lower latch 216. Springs 204 arrest rearward movement of blade 104 and bias it against lower latch 216, locking blade 104 in the stowed position within handle 102.

In embodiments, button 106 may be coupled to the trigger protrusion 212 such that button 106 does not slide in the same plane as blade 104. In some such embodiments, the plane of travel of button 106 is not parallel to the plane of travel of blade 104. The arrangement of the planes of travel may be adjusted to accommodate the components of action 200 in the most compact fashion possible.

As discussed above, action 200 has two catches 208 in the disclosed embodiment, although the forward catch nearest aperture 108 is not depicted in FIG. 2. This second catch is depicted herein in FIG. 6, below. In embodiments where knife 100 is a single action knife, action 200 may only have a rear catch 208 or a front catch, and button 106 may cause blade 104 to either retract or extend depending upon the action configuration, but not the opposite, viz. where action 200 causes extension, blade 104 must be manually stored, and vice-versa. The components of action 200 may vary depending upon the functionality provided by action 200.

Figure 3A:
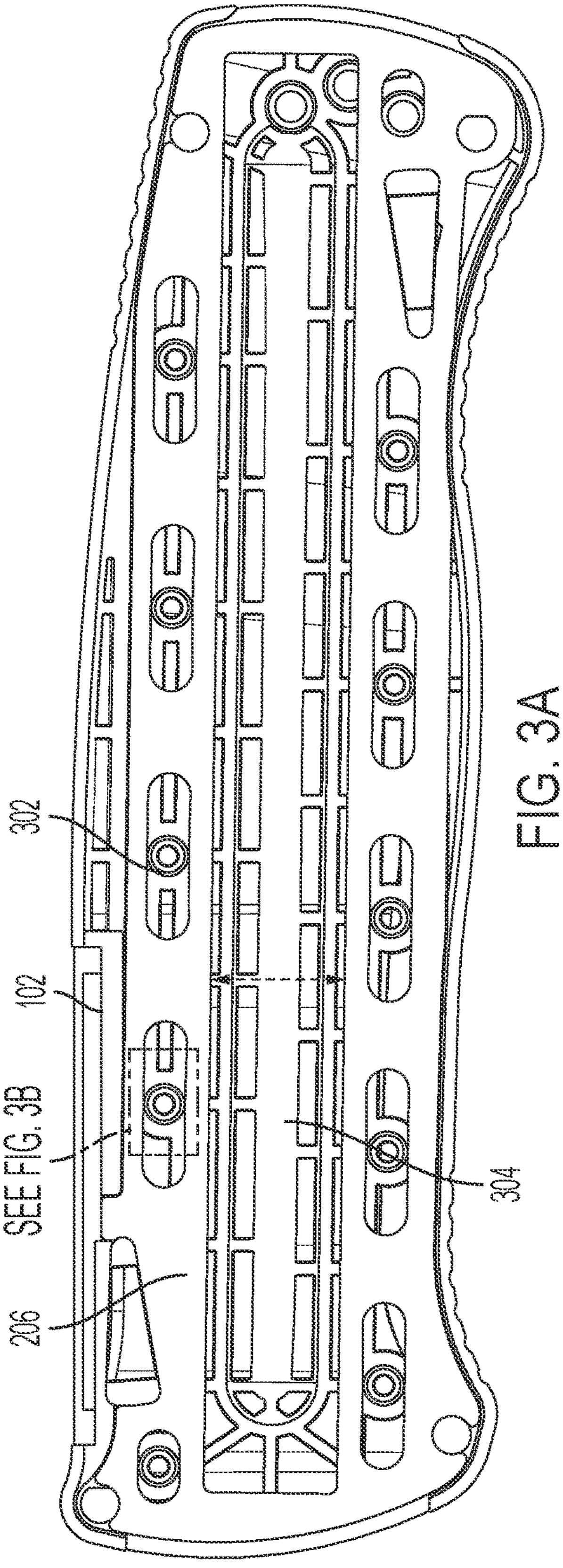
FIG. 3A is another side cutaway view of the handle of the example knife of FIG. 1, illustrating the action liner and a close-up of handle features, according to various embodiments.
Figure 3B:
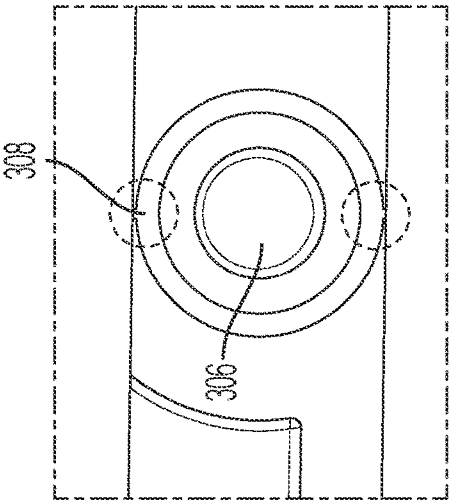
FIG. 3B is an inset view of a close-up of a post and crush rib feature of the handle in FIG. 3A, according to various embodiments.

In FIGS. 3A and 3B, first liner 202 and springs 204 are removed, to fully reveal the second liner 206. To save weight and better achieve a desired balance, in the depicted embodiment second liner 206 is skeletonized by creating a plurality of oval apertures 302. Furthermore, second liner 206 includes a central slot 304, to facilitate the travel of blade 104 when action 200 is actuated. In embodiments, blade 104 is equipped with a carrier block (not shown), secured to the tang of blade 104, that rides at least partially within central slot 304. Central slot 304 acts as a track to guide the travel of the carrier block, and by extension, to guide the travel of attached blade 104. Thus, the width of central slot 304, indicated by the double arrow, must be maintained at a proper spacing to ensure action 200 extends and retracts blade 104 reliably and smoothly. If the width of central slot 304 is too narrow, the carrier block may bind up on its travel, and prevent blade 104 from fully extending or retracting. If the width of central slot 304 is too wide, blade 104 may be able to drift within handle 102, and potentially bind up on an internal structure within handle 102. Furthermore, blade 104 may be subject to excessive play, diminishing the usefulness of knife 100, and possibly causing blade 104 to disengage from upper latch 214 while in use, causing blade 104 to unexpectedly retract into handle 102.

To help maintain second liner 206 in its correct position, the half of handle 102 may include a plurality of posts 306 (FIG. 3B) which correspond to each oval aperture 302, which centers and maintains second liner 206 vertically within handle 102 while allowing for the longitudinal movement necessary for action 200 to work. Each post 306 may further include a plurality of crush ribs 308 (shown in the circles in the inset, FIG. 3B), to absorb any variations due to manufacturing tolerances and maintain second liner 206 in its proper location. Second liner 206 may be manufactured from any suitable material that allows blade 104 to reliably extend from and retract into handle 102, such as metal, plastic, a composite, or another similar material.

The use of posts 306 with crush ribs 308 allows handle 102 to determine the correct position of second liner 206, as well as to maintain the correct width of central slot 304, even if second liner 206 is not manufactured with a precisely dimensioned central slot 304. Furthermore, the crush ribs 308 can help to add structural integrity to the liner, as well as helping to resist deformation of either handle 102 or second liner 206, thereby helping to retain the desired fit between the liner and the blade or blade carrier block for smooth operation, as discussed above. Without such structures, placing the oval apertures 302 through second liner 206 could detrimentally affect the structural integrity of second liner 206, and allow the width of central slot 304 to vary beyond acceptable limits. Thus, second liner 206 would need to be heavier and/or manufactured to tighter tolerances, which may increase manufacturing costs. The use of posts 306 and crush ribs 308 allows second liner 206 to be lightened, and also eases manufacturing, as the tolerances for handle 102 can be better controlled over the tolerances for the width of central slot 304 of second liner 206. Crush ribs 308 and/or posts 306 may be manufactured as part of handle 102, as a separate rivet, e.g. a crush rivet that includes both post 306 and crush ribs 308, or a combination of the two, e.g. the crush ribs may be molded as part of handle 102 while post 306 is formed by inserting a rivet into handle 102 between the molded crush ribs. Other implementations may be possible as well.

Figure 4A:
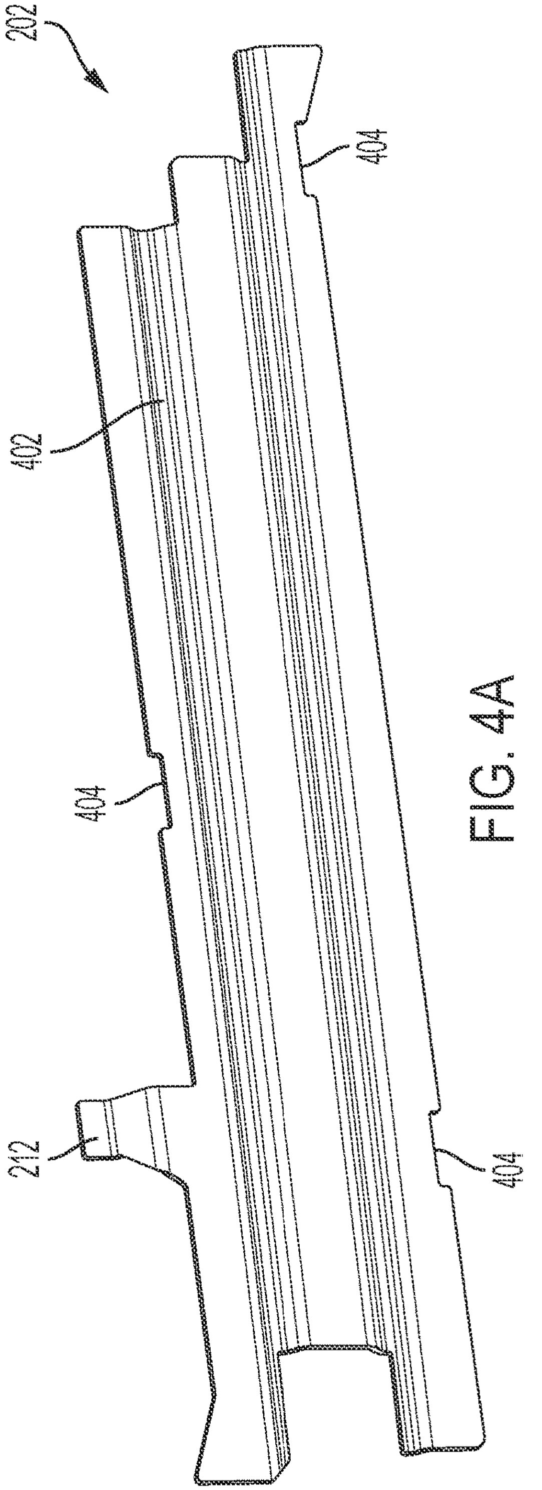
FIG. 4A is a side perspective view of a ribbed action liner that may be used in the example knife of FIG. 1, according to various embodiments.

Referring to FIG. 4A, a side perspective view of an example first liner 202 is depicted. In the depicted embodiment, first liner 202 includes a plurality of ribs 402, each of which are sized and placed to accept a spring 204 (not shown). First liner 202 further includes trigger protrusion 212 which cooperates with button 106 (not shown) when moved to trigger the action 200. First liner 202 also includes a plurality of notches 404 disposed on opposing edges. As will be seen in FIG. 5 below, these notches 404 cooperate with handle 102 to properly locate first liner 202 within the handle 102.

Figure 4B:
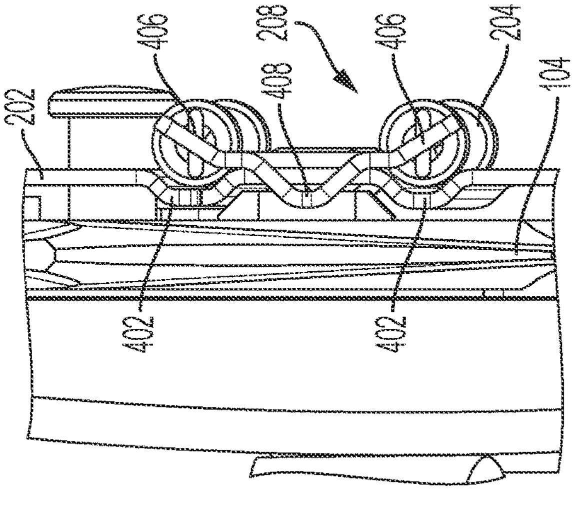
FIG. 4B is a front elevation view of the ribbed action liner and catch that may be used in the example knife of FIG. 1, according to various embodiments.

FIG. 4B depicts first liner 202 from a front perspective (as if viewed from aperture 108), and shows the interaction between first liner 202, springs 204, and catch 208. Catch 208, in FIG. 4B, corresponds to the front catch, which is not visible in FIG. 2. As can be seen in the depicted embodiment, springs 204 engage with catch 208 at first and second point 406. In the depicted embodiment, each spring 204 includes a hook structure which inserts into a corresponding hole on each point 406 (visible in FIG. 2), so that each spring 204 can interact with and impart energy to action 200 and blade 104 (shown in a tip-facing orientation in FIG. 4B). Catch 208 includes a protrusion 408, which engages to the aperture 210 (visible in FIG. 2) of blade 104. Also visible is each rib 402 partially containing a corresponding spring 204. The presence of each rib 402 allows each spring 204 to be inset closer to blade 104 and the center of knife 100. This allows action 200 to be made more laterally compact, which in turn allows handle 102 to be narrower, saving materials and weight, and improving comfort when using knife 100. Furthermore, the use of ribs 402 imparts a greater structural rigidity to first liner 202 for a given material, thus allowing first liner 202 to be manufactured from thinner material and providing further weight savings and cost savings in manufacture.

Figure 5:
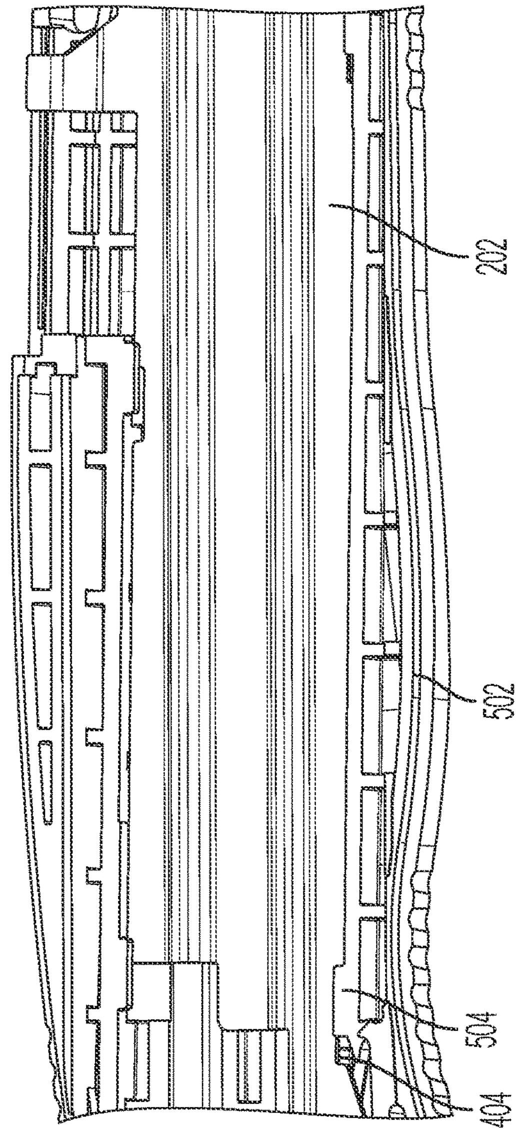
FIG. 5 is a side elevation view of the ribbed action liner of FIG. 4A as it is positioned within a half of a knife handle, according to various embodiments.

FIG. 5 illustrates how first liner 202 is retained to handle 102 in some embodiments. As can be seen, handle half 502 receives first liner 202, and includes a plurality of undercuts and tabs 504 that correspond to the plurality of notches 404 located along the edges of first liner 202. Each notch 404 is wider than the length of each tab 504 on handle half 502, which allows first liner 202 to move longitudinally relative to handle half 502, and thus longitudinally within handle 102. Tabs 504 further cooperate with notches 404 to center first liner 202 vertically within handle 102. Each tab 504 is formed out of an undercut formed into handle half 502, which creates a corresponding recess into which first liner 202 sits, as seen in the depicted embodiment. The tabs 504, in embodiments, aid in the installation of first liner 202, as tabs 504 match up to the notches 404 in the first liner 202 when in a forwardmost (load) position. The tabs 504 can assist assembly by retaining the second liner during assembly and preventing it from falling out. After installed to handle 102, first liner 202 can be slid back to its working travel, and the button 106 installed. The button 106 restricts the travel of the first liner 202 so that it cannot move to the load position and fall out.

In the depicted embodiment of FIG. 5, each tab 504 has an undercut, so that tab 504 can overlap a portion of first liner 202 at times as first liner 202 slides longitudinally within handle half 502. In some embodiments, each tab 504 may be approximately the size of each corresponding notch 404, so that first liner 202 is overlapped by each tab 504 during substantially all of its travel. Tabs 504 may thus help first liner 202 slide substantially longitudinally while limiting any lateral movement. Tabs 504 may further help keep first liner 202 vertically centered within handle half 502, and thus within handle 102, so that any motion of first liner 202 is substantially restricted only to longitudinal movement resulting from the operation of action 200 via button 106.

Figure 6:
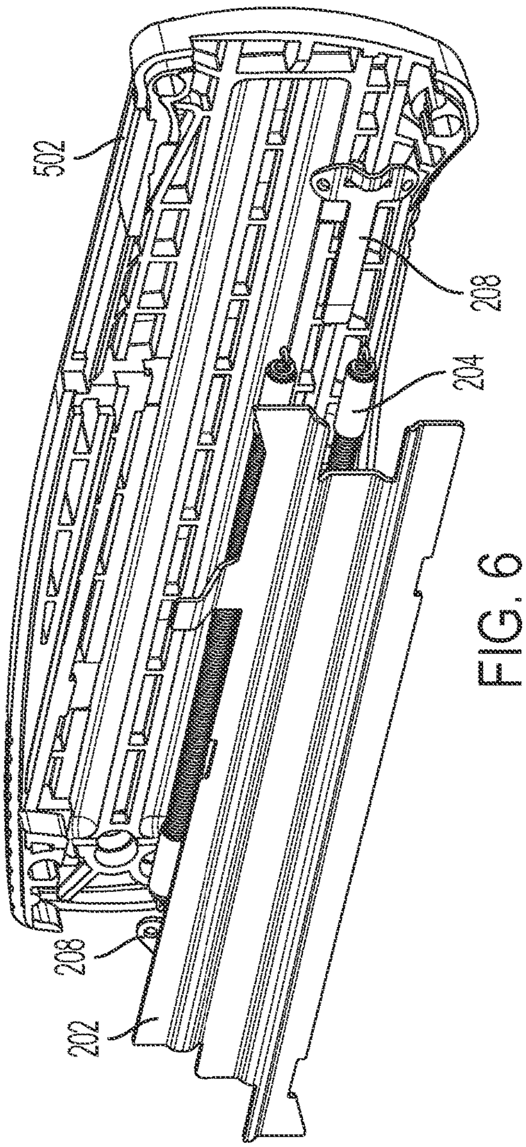
FIG. 6 is an exploded view of the ribbed action liner of FIG. 4A along with the springs and catches of the action that may be used in the example knife of FIG. 1, according to various embodiments.

FIG. 6 depicts handle half 502 with various components of action 200 in an exploded view. In particular, both catches 208 are visible at either end of springs 204, separate from first liner 202. One catch 208 retains blade 104 (not shown) in a stored position, and the other catch 208 retains blade 104 in an extended position. Furthermore, the ribs of first liner 202 allow springs 204 to be positioned between first liner 202 and handle half 502, thus saving size and weight. Without the ribs, handle half 502 would need to be substantially enlarged to accommodate springs 204, adding weight, or would require handle half 502 to be hollowed out, potentially compromising the structural integrity of handle 102.

Figure 7:
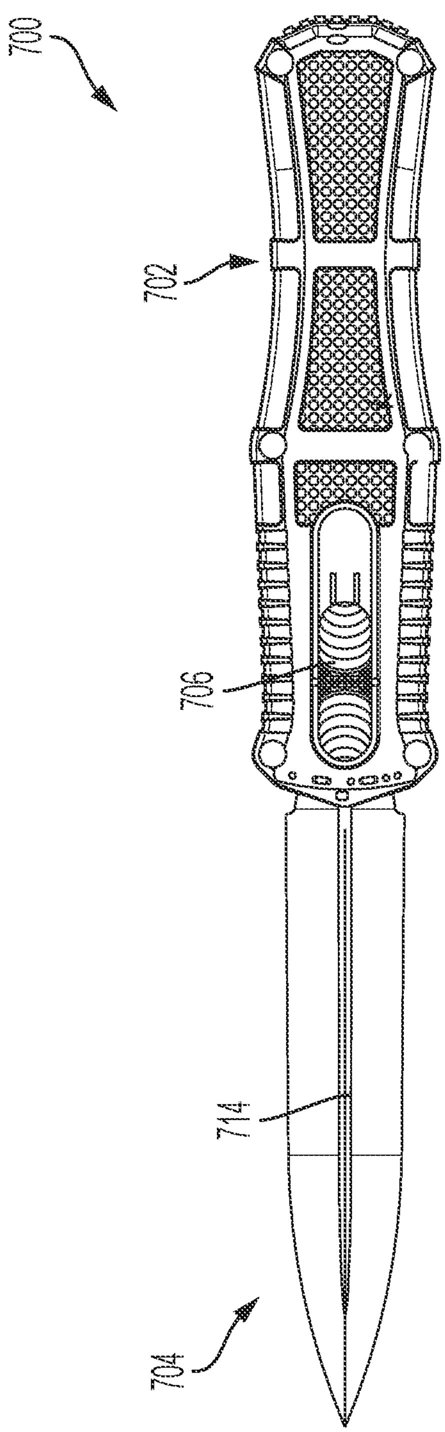
FIG. 7 is a side elevation view of a second example out-the-front knife with an optimized blade length and balance, in an extended configuration, in accordance with various embodiments.

FIG. 7, as mentioned above, depicts another possible embodiment of an out-the-front knife 700 with a blade length to handle length ration selected to provide optimal handling. Knife 700, in distinction from knife 100 depicted in FIG. 1, has a laterally symmetrical blade 704 where ridge 714 is disposed along the centerline of blade 704, allowing blade 704 to be double-edged. The button 706, as can be seen, is disposed along a side of handle 702, rather than along an edge. The action of knife 700 and its internal mechanisms may otherwise be implemented similar to the action of knife 100, as described above with respect to FIGS. 1-6, subject to any rearrangement that may be necessary to accommodate the different position of button 706.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

The invention that is claimed is:

1. A knife, comprising:

a blade; and a handle sized to enclose the blade when the blade is in a retracted position, the handle comprising:

a first handle half and a second handle half, each of the first and second handle halves including a plurality of retaining structures; and an aperture disposed at one end of the handle, the aperture sized to allow the blade to pass through; and an action contained within the handle and coupled to the blade, the action comprising:

a first liner with a central slot and a plurality of ovoid apertures disposed about the central slot, the first liner retained to the first handle half by the first handle half's plurality of retaining structures;

a second liner with a plurality of ribs that run parallel to a longitudinal axis of the second liner, the second liner retained to the second handle half by the second handle half's plurality of retaining structures; and a plurality of springs, each spring disposed within a corresponding one of the plurality of ribs, the plurality of springs mechanically coupled to the blade;

wherein the plurality of retaining structures of the first handle half comprise a plurality of posts, and the first liner is retained to the first handle half by each of the plurality of posts passing through a corresponding one of the plurality of ovoid apertures, each of the plurality of posts including a plurality of crush ribs that cooperate with each of the plurality of ovoid apertures to center the first liner within the first handle half.

2. The knife of claim 1, wherein the plurality of retaining structures of the second handle comprise a plurality of tabs, the second liner comprises a plurality of notches, and the second liner is retained to the second handle half by receiving one of the plurality of tabs into a corresponding one of the plurality of notches, the plurality of notches disposed along an edge of the second liner and configured to center the second liner vertically within the second handle half.

3. The knife of claim 1, wherein each of the plurality of crush ribs is configured to center the first liner into a correct position within the handle, while allowing the first liner to move along a longitudinal axis of the handle.

4. The knife of claim 3, wherein the plurality of crush ribs is further configured to position the first liner relative to the second liner to create a slot within which the blade travels when the blade is moving between the retracted position and an extended position, a width of the slot sized by the crush ribs to prevent the blade from shifting laterally when moving.

5. The knife of claim 3, wherein each of the plurality of crush ribs is formed as part of the first handle half.

6. The knife of claim 3, wherein each of the plurality of crush ribs is formed from a crush rivet that is inserted into the first handle half.

7. The knife of claim 1, wherein the knife, when the blade is in an extended position, has an overall length to weight ratio of 3:1, expressed in terms of inches to ounces.

8. The knife of claim 1, wherein the action further comprises a button disposed upon an exterior of the handle that is mechanically coupled to the action, the action configured such that, when the button is triggered when the blade is in a retracted position, the springs propel the blade through the aperture into an extended position where at least a portion of the blade is outside of the handle.

9. The knife of claim 8, wherein the action is further configured such that, when the button is triggered when the blade is in the extended position, the springs propel the blade through the aperture into the retracted position.

10. The knife of claim 1, wherein each of the plurality of ribs of the second liner extend parallel to a longitudinal axis of the second liner, and each of the plurality of springs is disposed beneath one of the plurality of ribs.

11. The knife of claim 1, wherein the blade comprises a single cutting edge, and a ridge disposed opposite the single cutting edge.

12. The knife of claim 1, wherein the blade comprises two cutting edges, and a ridge centered laterally between each edge of the two cutting edges.

13. A knife, comprising:

a blade;

a handle sized to enclose the blade when the blade is in a retracted position, the handle comprising:

a first handle half and a second handle half, each of the first and second handle halves including a plurality of retaining structures; and an aperture disposed at one end of the handle, the aperture sized to allow the blade to pass through; and an action contained within the handle and coupled to the blade, the action comprising:

a first liner with a central slot and a plurality of ovoid apertures disposed about the central slot, the first liner retained to the first handle half by the first handle half's plurality of retaining structures;

a second liner with a plurality of ribs, the second liner retained to the second handle half by the second handle half's plurality of retaining structures; and a plurality of springs, one of each disposed within each of the plurality of ribs, the plurality of springs mechanically coupled to the blade, wherein plurality of retaining structures of the first handle half comprise a plurality of posts, and the first liner is retained to the first handle half by each of the plurality of posts passing through a corresponding one of the plurality of ovoid apertures, each of the plurality of posts including a plurality of crush ribs that cooperate with each of the plurality of ovoid apertures to center the first liner within the first handle half.

* * * * *